United States Patent [19]
Birt et al.

[11] 4,020,247
[45] Apr. 26, 1977

[54] WATER ACTIVATED PRIMARY BATTERIES

[75] Inventors: Dennis Courtney Parsons Birt, Bournemouth; Ronald Holland, Wareham; Leonard John Pearce, Broadstone, all of England

[73] Assignee: The Secretary of State for Defense in Her Britannic Majesty's Government of the United Kingdom of Great Britain and Northern Ireland, London, England

[22] Filed: May 10, 1976

[21] Appl. No.: 684,984

Related U.S. Application Data

[63] Continuation-in-part of Ser. No. 539,683, Jan. 9, 1975, abandoned.

[30] Foreign Application Priority Data

Jan. 9, 1974 United Kingdom ............... 1082/74
July 31, 1974 United Kingdom ............ 33839/74

[52] U.S. Cl. ............................................. 429/119
[51] Int. Cl.² ........................................ H01M 6/34
[58] Field of Search ........................... 429/119, 118

[56] References Cited

UNITED STATES PATENTS

| | | |
|---|---|---|
| 1,481,178 | 1/1924 | Benner et al. ...................... 429/134 |
| 1,484,779 | 2/1924 | Heisl ..................................... 429/57 |
| 2,874,204 | 2/1959 | Morehouse et al. ............... 429/202 |
| 3,129,118 | 4/1964 | Wilke et al. ......................... 429/119 |
| 3,178,316 | 4/1965 | Wilke .................................. 429/119 |
| 3,279,951 | 10/1966 | Bowers et al. ..................... 429/119 |
| 3,432,350 | 3/1969 | Wilson ................................ 429/119 |
| 3,437,529 | 4/1969 | Honer .................................. 429/119 |
| 3,451,855 | 6/1969 | Jones et al. ......................... 429/119 |
| 3,749,608 | 7/1973 | Sarbacher .......................... 429/209 |
| 3,849,868 | 11/1974 | Jost ................................ 429/167 X |

*Primary Examiner*—C. F. Lefevour
*Attorney, Agent, or Firm*—Pollock, Vande Sande & Priddy

[57] ABSTRACT

A water activated primary battery in which each cell includes a cathode manufactured largely from an oxyhalogen material and an anode of aluminum, magnesium, zinc or alloys thereof, the electrodes being separated and insulated from one another by a porous membrane; the main feature of the invention being the sandwich construction of the cells and design of the anode which is perforated to provide access of the electrolyte to the cathode and escape of gas from the cell and dimpled to facilitate uniform compaction of the cathode material and to provide cooling water/electrolyte passageways in each cell.

6 Claims, 2 Drawing Figures

WATER ACTIVATED PRIMARY BATTERIES

This is a continuation in part of application Ser. No. 539,683, filed Jan. 9, 1975 (abandoned).

This invention relates to the design of primary batteries. More particularly, but not exclusively, the invention relates to the design of water activated primary batteries. The invention also relates to a novel design of anode and battery construction for use in such primary batteries. Water activated primary batteries have a variety of applications where some or all of the following attributes are desirable:

Prolonged dry storage, reliability, simple and rapid activation by immersion in or addition of water, capability of operation over a wide range of power levels and high energy/weight and power/weight ratios.

Commonly water activated primary batteries use silver chloride as the cathode material. An economic disadvantage is that the cost of silver chloride is a major factor in limiting the size of batteries and the scope of applications to specialized and emergency operations.

The applicants of the present invention have disclosed (see for example the paper by Pearce and Holland presented at the 8th International Electrical Power Sources Symposium at Brighton in 1972) their proposals for using low cost materials for the manufacture of the cathode while retaining the favorable features quoted above. The concept of this high energy battery activated by sea water and made from low cost materials is that the anodes should be made from an aluminum alloy while the cathodes are formed from a mixture of an organic chlorinating agent and carbon black. The organic chlorinating agent is trichlorotriazinetrione, also known as trichloroisocyanuric acid. It is known that trichlorotriazinetrione is hydrolyze by slightly acidic solutions such as aqueous solutions of aluminum chloride to give chlorine which is readily reduced electro-chemically. The electrode thus behaves as a chlorine electrode but without the necessity of supplying chlorine gas. The discharge products of the anode maintain the aluminum chloride concentration favorable to operation of the cathode at high current densities. Various electro-chemically active alloys of magnesium or zinc may alternatively be used as the anode material to form an electro-chemical cell in conjunction with the above type of cathode.

It should be noted however that if magnesium or zinc is used as the anode material at high output rates then a sufficient supply of an acidic solution eg, aluminum chloride would be required to maintain sufficient acidity of the electrolyte within the cathode throughout the discharge.

In the battery design described above the anode and the cathode of each cell were separated by a space containing the aluminum chloride electrolyte solution, the electrodes being kept apart by a polythene mesh which permitted the passage of electrolyte across the surface of the electrodes to allow escape of gas and removal of heat is required. However this design suffers from a number of limitations especially when the battery is operated at high current density (eg $0.1$ $A/cm^2$). In particular the heat output of the battery is of similar magnitude to the electrical energy output and attempts to dissipate this heat by passing additional fresh sea water through the electrolyte space diluted the aluminum chloride concentration to a level insufficient to maintain the cathode discharge. Furthermore electrolyte flow can be impeded by gas bubbles trapped in the mesh of the inter-electrode spacer and by protrusion of the relatively soft cathode material into the mesh.

According to the present invention the cell of a water activated primary battery includes a cathode and an anode separated and insulated from one another by a porous membrane of paper, cloth or other like material, which is permeable to the flow of liquids and gases therethrough, the anode being perforated to permit entry of electrolyte to the cathode during initial priming of the cell as well as subsequent ingress of fresh electrolyte through the perforated anode during discharge of the cell, and to facilitate the escape of gas from within the cell during its operation.

In one arrangement of the invention the anode material is aluminum, magnesium or zinc or alloys thereof and the cathode material is manufactured from an organic oxy-halogen material mixed with carbon black. One such organic oxy-halogen is trichlorotriazinetrione.

An alternative organic oxy-halogen material is 1.3 dibromb - 5.5 dimethylhydantoin.

In an alternative arrangement of the design of the invention the cathode material is manufactured from an inorganic material such as those conventionally used in water activated batteries e.g. silver chloride.

In battery arrangements in which the cell or cells are constituted of substantially flat plates the perforated anode may with advantage be formed with an array of integral conductive spacer dimples or depressions which serve, in use, to space the anode away from the wall of the cell or, in the case of a multi-cell battery, the cathode backing plate of the adjacent cell. The space so provided takes the form of plannar gaps between the anode and the adjacent wall or cathode backing plate which may conveniently serve as a passageway through which cooling water/electrolyte can be circulated. Furthermore electrical connections to and from the anode may conveniently be made through the spacer dimples or depressions of the anode plate. In the case of a multi-cell battery the spacer dimples can provide the direct electrical connection between the anode of one cell and the cathode backing plate of the adjacent cell.

In a preferred arrangement of the invention a water activated battery comprises at least two cells each of which include an aluminum or aluminum alloy anode plate and a cathode plate manufactured from a mixture of an organic oxy-halogen material and carbon black separated and insulated from one another by a porous membrane of paper, cloth or other like material, the anode plate being perforated to allow the entry of priming electrolyte to the cathode and escape of gas from the cathode.

In an improved arrangement of the invention as applied to a multi-cell construction the perforated anode plate may with advantage be provided with a number of spacer dimples or depressions which act to space the anode plate away from the backing plate of the cathode of the adjacent cell, the spacer dimples as well as providing for direct electrical connection to and from the anode plate and the automatic creation of a cooling passageway between the anode plate of one cell and the cathode backing plate of the adjacent cell, also serving to ensure uniform compaction of the cathode material during assembly of the battery.

In yet another arrangement of the invention a single cell may include a substantially cylindrical cathode member built up around a current collector core and enclosed within a perforated cylindrical sleeve anode, there being a layer of paper, cloth or other like material, separating the opposing surfaces of the anode and the cathode. In use the single cell battery is simply immersed in sea water.

Two general embodiments of the invention as applied to water activated primary batteries will now be described by way of example only and with reference to the accompanying drawings in which.

Figure 1:
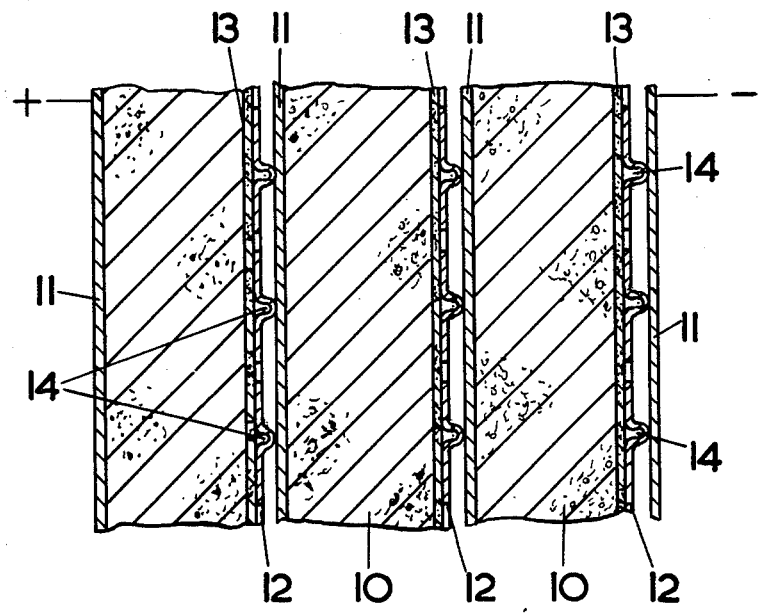
FIG. 1 shows schematically a cross-section through a multi-cell primary battery.

Referring to FIG. 1 the battery comprises a series of cells each having a cathode 10 mounted on a backing plate 11, a perforated anode plate 12 disposed in a plane substantially parallel to the plane of backing plate 11 and, sandwiched therebetween, a porous membrane 13 permeable to the flow of liquids and gases therethrough.

Electrical connection between the perforated anode 12 of one cell and the cathode backing plate 11 of an adjacent cell is effected by an arral of integral conductive dimples or depressions 14 formed in the perforated anode sheet 12.

A water activated battery made in accordance with the invention comprised 7 cells each having as the anode plate 12 a circular sheet of aluminum alloy 0.015 inches thick and 9.25 inches in diameter, the sheet being perforated and dimpled with an approximate density of 9 holes and 9 dimples per square inch respectively. The holes were 0.01 inches in diameter and the dimples were of a size to provide a clear 0.02 inches gap between the anode plate 12 and the parallel cathode backing plate 11. The cathode 10 material was made from a mixture of 50–80% by weight of the common bleaching agent trichlorotriazinetrione, also known as trichloroisocyanuric acid, with carbon black together with a binding agent such as cellulose or viscose fibres. These materials were mixed in the form of a slurry with a dispersing agent such as a volatile hydrocarbon or trichlorethylene which was subsequently evaporated off. Alternatively the materials in powder form could have been dry mixed and then compressed to the required shapes. The cathode was 9.00 inches in diameter and 0.08 inches thick. The cathode backing plate 11 must be made of a conducting material inert to chlorine in an acidic environment. Titanium can be used but the presence of a passivate oxide film on the side facing the cathode can give an unacceptably high electrical resistance. This problem may be overcome by scratch brushing the surface of the titanium or by partially coating the titanium with graphite by rubbing it with a graphite rod. The preferred material however, and that used, was zinc sheet 9.25 inches in diameter and 0.013 inches thick painted on the side facing the cathode with a conducting carbon rich paint. This is a lower cost material and gives good electrical contact to both the cathode 10 and the dimpled perforated anode plate 12. The porous membrane 13 was a 9.25 inch diameter sheet of paper although cloth or other similar material is equally suitable.

The assembled cells were compacted together under a pressure of 50 lbs per square inch to consolidate the electrode material and to ensure good electrical contact between the cells. The compacted assembly was then sealed by cementing the cells together around their peripheries with an epoxy resin.

In use and for high rate/high power discharges at current densities over $0.05 A/cm^2$ the battery was activated by initially filling it with a solution of aluminum chloride of about 1 molar concentration. At lower current densities this initial priming is unnecessary and the battery will operate when filled with a salt solution such as sea water.

The aluminum chloride formed at the surface of the anode plate 12 diffuses through the porous membrane 13 into the porous cathode 10 and the perforations in the anode plate 12 allow gas to escape into the space behind the adjacent cathode backing plate 11 where, if necessary, cooling water may be circulated. The perforations also allow entry of electrolyte to the cathode during the initial priming as well as subsequent ingress of fresh electrolyte during the discharge of the cell.

The typical output of a battery based on the above components was 500 watts for 23 minutes.

A further water activated battery made in accordance with this general embodiment of the invention comprised rectangular cathode plaques 2.4 inches by 2.4 inches by 0.05 inches thickness made by the dry compaction of mixtures of varying proportions of 1,3-dibromo-5,5-dimethylhydantoin and carbon black with about 2½% of chopped viscose fibre. For improved storage capability these cathode plaques were used in preference to the trichlorotriazinetrione and carbon black cathodes described above. The ratio of cathode reactant to carbon black was varied from 2:1 to 8:1 with equally satisfactory results. Aluminum, magnesium or zinc can be used as the anode material, preference being given to those alloys of these metals which are known to be electro-chemically active in sea water.

With sea water flowing past the back face of the anodes electro-chemical utilization of the reactant was typically in the range of 80 to 90%. Satisfactory discharge curves with constant voltage plateau have been obtained at 20° C at current densities up to $0.01 A/cm^2$. By raising the temperature to 70–80° C the current density could be increased to over $0.10 A/cm^2$.

One specific advantage in the use of 1,3-dibromo-5,5-dimethylhydantoin as the cathode material over trichlorotriazinetrione is that the cells can be temporarily drained without evolution of excessively noxious vapors.

Figure 2:
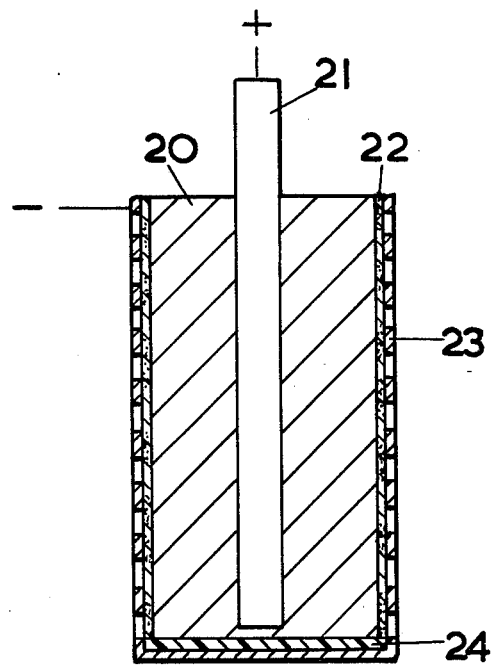
FIG. 2 shows schematically a section through a single cylindrical water activated cell.

Referring now to FIG. 2 a cylindrical water activated cell comprises a cylindrical cathode 20 (of either of the cathode mixtures referred to with reference to FIG. 1) formed around a carbon rod 21 which acts as the cathode current collector. The cathode 20 is surrounded by a porous membrane 22 of paper or cloth which is in turn encased in a perforated can 23 of electrochemically active aluminum alloy which acts as the anode. An insulating plug 24 of plastic material may be fitted at the base of the cathode 20 to simplify construction of the cell.

This cell is activated simply by immersing it in a salt solution such as sea water.

Although the novel perforated and perforated/dimpled anode plates of the invention have been described with reference to their use in a water activated primary battery embodying organic oxy-halogen cathode materials it will be readily appreciated by those skilled in the art that the design of battery construction has equally attractive features, other than cost, when applied to water activated batteries embodying conventionally used inorganic cathode materials eg silver chloride.

We claim:

1. A water activated primary battery comprising a plurality of cells which are assembled in juxtaposed relation to one another, each of said cells being of sandwich construction and comprising a cathode consisting of a flat layer of porous cathode material having an imperforate electrically conductive flat backing plate in surface engagement with one flat side of said porous layer, said cell including a porous membrane of electrically insulating sheet material in surface engagement with the other flat side of said porous cathode layer, said porous membrane being permeable to the flow of liquids and gases therethrough, and said cell further including an anode constituting a flat plate of conductive material extending in a plane substantially parallel to the plane of said cathode backing plate in surface engagement with the side of said porous, insulating membrane remote from said porous cathode layer, said conductive anode plate being perforated to permit entry of electrolyte for said cell through the perforations in said anode plate to said porous cathode layer via said intervening porous membrane of insulating material during initial priming of the cell, as well as subsequent ingress of fresh electrolyte through said perforated anode during discharge of the cell, and to facilitate the escape of gas from within the cell through said porous membrane and thence through the perforations in said anode plate during operation of said cell, the conductive anode plate in each of said cells being formed with an array of integral conductive dimples extending in spaced relation to one another outwardly of the plane of said anode plate in a direction away from the cathode of said cell, said plurality of cells being juxtaposed and maintained in assembled configuration under pressure with their respective anodes and cathodes positioned in substantially parallel relation to one another and with the outwardly extending conductive dimples of the perforated anode in each cell being in direct pressure engagement with the outer surface of the conductive cathode backing plate of the next adjacent cell thereby to provide the direct electrical connection between the conductive anode plate of one cell and the conductive cathode backing plate of the next adjacent cell as well as to provide uniform compaction of the plural layers of porous cathode material in said battery, said arrays of dimples further defining planar gaps located respectively between the outermost surface of the perforated anode plate of each cell and the outermost surface of the cathode backing plate of the next adjacent cell, said gaps acting as electrolyte passageways within said battery through which electrolyte may flow on the anode side of each cell remote from the cathode of said cell for entry of electrolyte into each cell through the perforated anode of said cell and thence through the porous insulating membrane of said cell.

2. A water activated primary battery as claimed in claim 1 in which the anode in lock cell is of a material selected from the group comprising aluminum, magnesium, zinc or alloys thereof.

3. A water activated primary battery as claimed in claim 2 in which the cathode in lock cell is manufactured largely from an organic oxy-halogen material.

4. A water activated primary battery as claimed in claim 2 in which the cathode layer in each cell is manufactured from an inorganic material.

5. A water activated primary battery as claimed in claim 3 in which the organic oxy-halogen material is selected from the group comprising trichlorotriazinetrione and 1,3-dibromo-5,5-dimethylhydantoin.

6. A water activated primary battery as claimed in claim 4 in which the inorganic material is silver chloride.

* * * * *